US007863369B2

(12) United States Patent
Bianchi et al.

(10) Patent No.: US 7,863,369 B2
(45) Date of Patent: *Jan. 4, 2011

(54) PIGMENTS AND POLYMER COMPOSITES FORMED THEREOF

(75) Inventors: Catherine Bianchi, Aubervilliers (FR); Shamshad Noor, Lowell, MA (US); Christopher Mirley, Winthrop, MA (US); Ralph Bauer, Niagara Falls (CA); Doruk O. Yener, Wilmington, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,398

(22) Filed: Dec. 16, 2008

(65) Prior Publication Data

US 2009/0099284 A1 Apr. 16, 2009

Related U.S. Application Data

(62) Division of application No. 11/269,508, filed on Nov. 8, 2005, now Pat. No. 7,479,324.

(51) Int. Cl.
C08K 3/18 (2006.01)
C08L 9/00 (2006.01)
C08L 9/06 (2006.01)

(52) U.S. Cl. ............ 524/430; 523/200; 106/31.27; 106/262; 106/272; 428/32.34; 428/32.36

(58) Field of Classification Search ............. 428/32.26, 428/32.34, 403; 523/200; 524/430; 106/31.43, 106/31.27, 287.17, 816, 272, 262
See application file for complete search history.

(56) References Cited

U.S. PATENT DOCUMENTS

| 2,763,620 | A | 9/1956 | Bugosh |
| 2,915,475 | A | 12/1959 | Bugosh |
| 3,056,747 | A | 10/1962 | Arthur, Jr. |
| 3,108,888 | A | 10/1963 | Bugosh |
| 3,117,944 | A | 1/1964 | Harrell |
| 3,136,644 | A | 6/1964 | Pangonis |
| 3,202,626 | A | 8/1965 | FitzSimmons |
| 3,321,272 | A | 5/1967 | Kerr |
| 3,357,791 | A | 12/1967 | Napier |
| 3,385,663 | A | 5/1968 | Hughes |
| 3,387,447 | A | 6/1968 | Trammell et al. |
| 3,790,495 | A | 2/1974 | Podschus |
| 3,814,782 | A | 6/1974 | Hayes et al. |
| 3,842,111 | A | 10/1974 | Meyer-Simon et al. |
| 3,853,688 | A | 12/1974 | D'Ambrosio |
| 3,865,917 | A | 2/1975 | Galasso et al. |
| 3,873,489 | A | 3/1975 | Thurn et al. |
| 3,950,180 | A | 4/1976 | Kato |
| 3,978,103 | A | 8/1976 | Meyer-Simon et al. |
| 3,997,581 | A | 12/1976 | Pletka et al. |
| 4,002,594 | A | 1/1977 | Fetterman |
| 4,105,465 | A | 8/1978 | Berger |
| 4,117,105 | A | 9/1978 | Hertzenberg et al. |
| 4,120,943 | A | 10/1978 | Iwaisako et al. |
| 4,344,928 | A | 8/1982 | Dupin et al. |
| 4,377,418 | A | 3/1983 | Birchall et al. |
| 4,386,185 | A | 5/1983 | Macdonell et al. |
| 4,492,682 | A | 1/1985 | Trebillon |
| 4,525,494 | A | 6/1985 | Andy |
| 4,539,365 | A | 9/1985 | Rhee |
| 4,558,102 | A | 12/1985 | Miyata |
| 4,623,738 | A | 11/1986 | Sugerman et al. |
| 4,632,364 | A | 12/1986 | Smith |
| 4,716,029 | A | 12/1987 | Oguri et al. |
| 4,769,179 | A | 9/1988 | Kato et al. |
| 4,797,139 | A | 1/1989 | Bauer |
| 4,835,124 | A | 5/1989 | Pearson |
| 4,891,127 | A | 1/1990 | Murrel et al. |
| 4,946,666 | A | 8/1990 | Brown |
| 4,992,199 | A | 2/1991 | Meyer et al. |
| 5,155,085 | A | 10/1992 | Hamano et al. |
| 5,194,243 | A | 3/1993 | Pearson et al. |
| 5,286,290 | A | 2/1994 | Risley |
| 5,302,368 | A | 4/1994 | Harato et al. |
| 5,306,680 | A | 4/1994 | Fukuda |
| 5,318,628 | A | 6/1994 | Matijevic et al. |

(Continued)

FOREIGN PATENT DOCUMENTS

CN 1237146 A 12/1999

(Continued)

OTHER PUBLICATIONS

"Halogenated Polyolefin." Thermoplastic Elastomers Properties and Applications. Rapra Review Reports. vol. 7, pp. 17-18, 1995.*

(Continued)

Primary Examiner—Vasu Jagannathan
Assistant Examiner—Hannah Park
(74) Attorney, Agent, or Firm—Larson Newman & Abel, LLP; Joseph P. Sullivan

(57) ABSTRACT

A composite material includes a polymer matrix and a pigment dispersed in the polymer matrix. The pigment includes an alumina hydrate particulate material and a dye. The dye is covalently bonded to a surface of the alumina hydrate particulate material.

20 Claims, 4 Drawing Sheets

U.S. PATENT DOCUMENTS

| | | | |
|---|---|---|---|
| 5,321,055 A | 6/1994 | Slocum | |
| 5,332,777 A | 7/1994 | Goetz et al. | |
| 5,344,489 A | 9/1994 | Matijevic et al. | |
| 5,401,703 A | 3/1995 | Fukuda | |
| 5,413,985 A | 5/1995 | Thome et al. | |
| 5,445,807 A | 8/1995 | Pearson | |
| 5,508,016 A | 4/1996 | Yamanishi et al. | |
| 5,527,851 A | 6/1996 | Barron et al. | |
| 5,550,180 A | 8/1996 | Elsik et al. | |
| 5,580,914 A | 12/1996 | Falla et al. | |
| 5,580,919 A | 12/1996 | Agostini et al. | |
| 5,583,245 A | 12/1996 | Parker et al. | |
| 5,663,396 A | 9/1997 | Musleve et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,707,716 A | 1/1998 | Yoshino et al. | |
| 5,723,529 A | 3/1998 | Bernard et al. | |
| 5,785,722 A | 7/1998 | Garg et al. | |
| 5,849,827 A | 12/1998 | Boediger et al. | |
| 5,900,449 A | 5/1999 | Custodero et al. | |
| 5,955,142 A | 9/1999 | Yoshino et al. | |
| 5,962,124 A | 10/1999 | Yoshino et al. | |
| 5,989,515 A | 11/1999 | Watanabe et al. | |
| 6,017,632 A | 1/2000 | Pinnavaia et al. | |
| 6,143,816 A | 11/2000 | Prescher et al. | |
| 6,156,835 A | 12/2000 | Anderson et al. | |
| 6,203,695 B1 | 3/2001 | Harle et al. | |
| 6,403,007 B1 | 6/2002 | Kido et al. | |
| 6,413,308 B1 | 7/2002 | Xu et al. | |
| 6,417,286 B1 | 7/2002 | Agostini et al. | |
| 6,440,187 B1 | 8/2002 | Kasai et al. | |
| 6,440,552 B1 | 8/2002 | Kajihara et al. | |
| 6,485,656 B1 | 11/2002 | Meyer et al. | |
| 6,486,254 B1 | 11/2002 | Barbee et al. | |
| 6,534,584 B2 | 3/2003 | Wideman et al. | |
| 6,576,324 B2 | 6/2003 | Yoshino et al. | |
| 6,610,261 B1 | 8/2003 | Custodero et al. | |
| 6,635,700 B2 | 10/2003 | Cruse et al. | |
| 6,646,026 B2 | 11/2003 | Fan et al. | |
| 6,648,959 B1 | 11/2003 | Fischer et al. | |
| 6,653,387 B2 | 11/2003 | Causa et al. | |
| 6,689,432 B2 | 2/2004 | Kitamura et al. | |
| 6,706,660 B2 | 3/2004 | Park | |
| 6,747,087 B2 | 6/2004 | Custodero et al. | |
| 6,841,207 B2 | 1/2005 | Burch et al. | |
| 6,858,665 B2 | 2/2005 | Larson | |
| 6,872,444 B2 | 3/2005 | McDonald et al. | |
| 6,924,011 B2 | 8/2005 | Van Aert et al. | |
| 7,056,585 B2 | 6/2006 | Mishima et al. | |
| 7,189,775 B2 | 3/2007 | Tang et al. | |
| 7,211,612 B2 | 5/2007 | Kikuchi | |
| 7,226,647 B2 * | 6/2007 | Kasperchik et al. | 428/32.36 |
| 7,479,324 B2 * | 1/2009 | Bianchi et al. | 428/403 |
| 7,531,161 B2 | 5/2009 | Tang et al. | |
| 2002/0004549 A1 | 1/2002 | Custodero et al. | |
| 2002/0169243 A1 | 11/2002 | Nippa | |
| 2003/0095905 A1 | 5/2003 | Scharfe et al. | |
| 2003/0185739 A1 | 10/2003 | Mangold et al. | |
| 2003/0197300 A1 | 10/2003 | Tang et al. | |
| 2003/0202923 A1 | 10/2003 | Custodero et al. | |
| 2004/0030017 A1 | 2/2004 | Simonot et al. | |
| 2004/0120904 A1 | 6/2004 | Lye et al. | |
| 2004/0265219 A1 | 12/2004 | Bauer et al. | |
| 2005/0124745 A1 | 6/2005 | Bauer et al. | |
| 2005/0227000 A1 | 10/2005 | Bauer et al. | |
| 2005/0267238 A1 | 12/2005 | Mutin | |
| 2006/0096891 A1 | 5/2006 | Stamires et al. | |
| 2006/0104895 A1 | 5/2006 | Bauer et al. | |
| 2006/0106129 A1 | 5/2006 | Gernon et al. | |
| 2006/0148955 A1 | 7/2006 | Guiselin et al. | |
| 2007/0104952 A1 | 5/2007 | Bianchi et al. | |
| 2007/0148083 A1 | 6/2007 | Bauer et al. | |
| 2008/0003131 A1 | 1/2008 | Bauer et al. | |
| 2008/0031808 A1 | 2/2008 | Bauer et al. | |

FOREIGN PATENT DOCUMENTS

| | | |
|---|---|---|
| CN | 1266020 A | 9/2000 |
| CS | 195426 | 5/1982 |
| DE | 956535 | 1/1957 |
| DE | 2163678 | 7/1973 |
| DE | 2408122 | 8/1974 |
| DE | 2952666 | 7/1980 |
| DE | 19931204 | 1/2001 |
| EP | 0038620 A2 | 10/1981 |
| EP | 0015196 | 4/1982 |
| EP | 0108968 A1 | 5/1984 |
| EP | 0304721 A1 | 3/1989 |
| EP | 0563653 A1 | 10/1993 |
| EP | 0667405 A1 | 8/1995 |
| EP | 0501227 B1 | 12/1995 |
| EP | 0735001 A2 | 10/1996 |
| EP | 0736392 A1 | 10/1996 |
| EP | 0885844 A1 | 12/1998 |
| EP | 0896021 A1 | 2/1999 |
| EP | 1225200 A2 | 7/2002 |
| EP | 1256599 A1 | 11/2002 |
| EP | 1323775 A1 | 7/2003 |
| EP | 0697432 B1 | 10/2003 |
| EP | 1000965 B1 | 10/2003 |
| EP | 0807603 B1 | 12/2003 |
| EP | 1112961 B1 | 9/2004 |
| FR | 2927267 A1 | 8/2009 |
| GB | 1022944 | 3/1966 |
| GB | 1189304 | 4/1970 |
| GB | 2248841 A | 4/1992 |
| HU | 26758 T | 9/1983 |
| JP | 45032530 | 10/1970 |
| JP | 55116622 A | 9/1980 |
| JP | 56009427 A | 1/1981 |
| JP | 58026029 A2 | 2/1983 |
| JP | 58185434 A | 10/1983 |
| JP | 59193949 | 11/1984 |
| JP | 60-046923 | 3/1985 |
| JP | 61-179264 A | 8/1986 |
| JP | H4-78586 A | 9/1986 |
| JP | 62-030133 A | 2/1987 |
| JP | 63147820 A2 | 6/1988 |
| JP | 63147821 A2 | 6/1988 |
| JP | S63-131321 | 6/1988 |
| JP | 05279019 | 10/1993 |
| JP | 6322243 | 11/1994 |
| JP | 07018174 | 1/1995 |
| JP | 9-99627 | 4/1997 |
| JP | 09208809 | 8/1997 |
| JP | 09511258 | 11/1997 |
| JP | H9-511258 | 11/1997 |
| JP | 2686833 B2 | 12/1997 |
| JP | 2000-86235 A | 3/2000 |
| JP | 2000239014 | 9/2000 |
| JP | 2001058818 A | 3/2001 |
| JP | 2001-139326 A | 5/2001 |
| JP | 2001180930 | 7/2001 |
| JP | 20010207077 | 7/2001 |
| JP | 2001261976 | 9/2001 |
| JP | 2001-323188 A | 11/2001 |
| JP | 2003002642 | 1/2003 |
| JP | 2003054941 | 2/2003 |
| JP | 2003107206 | 4/2003 |
| JP | 2003238150 | 8/2003 |
| JP | 2003238826 A | 8/2003 |
| JP | 2003-313027 A | 11/2003 |
| JP | 2004-001463 A | 1/2004 |

| | | | |
|---|---|---|---|
| JP | 200459643 A | 2/2004 |
| JP | 2004051390 A2 | 2/2004 |
| JP | 2004-122784 | 4/2004 |
| KR | 10-2001-0047270 A | 6/2001 |
| RU | 2148567 C1 | 5/2000 |
| SU | 267064 A | 7/1970 |
| SU | 1444080 A1 | 12/1988 |
| WO | 9511270 | 4/1995 |
| WO | 9723566 | 7/1997 |
| WO | 9814426 | 4/1998 |
| WO | 9935089 A1 | 7/1999 |
| WO | 0188265 A2 | 11/2001 |
| WO | 03/011941 A2 | 2/2003 |
| WO | 03/011941 A3 | 2/2003 |
| WO | 03089508 A1 | 10/2003 |
| WO | 2004016630 A1 | 2/2004 |
| WO | 2004056915 A1 | 7/2004 |
| WO | 2004090023 A1 | 10/2004 |
| WO | 2005100244 A2 | 10/2005 |
| WO | 2005100491 A2 | 10/2005 |
| WO | 2006002993 A1 | 1/2006 |
| WO | 2006049863 A1 | 5/2006 |
| WO | 200660206 A1 | 6/2006 |
| WO | 200660468 A3 | 6/2006 |
| WO | 2007056404 A1 | 5/2007 |
| WO | 2009109722 A1 | 9/2009 |

OTHER PUBLICATIONS

Cuneyt Tas, A., "Chemical Preparation of the Binary Compounds in the Calcia-Alumina Systems by Self-Propagating Combustion Synthesis," J. Am. Ceram. Soc., vol. 81, No. 11, pp. 2853-2863, 1998.

Tsai, D., et al., "Controlled Gelation and Sintering of Monolithic Gels Prepared from gamma-Alumina Fume Powder," J. Am. Ceram. Soc., vol. 74, No. 4, pp. 830-836, 1991.

Alexander, K. et al., "Grain Growth Kinetics in Alumina-Zirconia (CeZTA) Composites," J. Am. Ceram. Soc., vol. 77, No. 4, pp. 939-946, 1994.

Okada, K. et al., "Effect of Divalent Cation Additives on the gamma-Al2O3-to-Al2O3 Phase Transition," J. Am. Ceram. Soc., vol. 83, No. 4, pp. 928-932, 2000.

Brusasco, Raymond, M. "Preparation and Characterization of Acicular Particles and Thin Films of Aluminum Oxide," Thesis Brown University, May 1987, 107 pgs.

Thomas J. Martin, Sasol Presentation given on—Functionalized Aluminas, Nabal Tech, web page: http://www.nabaltec.de/seiten_d/boehmit_d/anwendungen/news_05_08_98.htm, (2004).

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based on Polymer Matrices & Organic Components", NTIS, Germany 1994.

Buining et al., J. Am. Ceram. Soc. vol. 74 [6], pp. 1303-1307, (1990).

Anonymous: "High Purity Dispersible Aluminas"; URL:http://www.sasol.com/sasol_internet/downloads/DISPERAL-DISPAL_1055338543391.pdf>abstract; tables 1,2, (2003).

Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.

Grant et al., "Grant and Hackh's Chemical Dictionary", 5th Ed., (1987), McGraw-Hill Book. Co. USA, ISBN 0-07-024067-1, p. 160.

Zhang, L. et al., "Preparation and Characterization of Nano-fibrous g-Al2O3," Shiyou Huagong, vol. 33, No. 3, pp. 240-243, 2004. Abstract Only.

Zhu, H. et al., "Novel Synthesis of Alumina Oxide Nanofibers," Materials Research Society Symposium Proceedings, vol. 703, pp. 25-30, 2002. Abstract Only.

Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002. Abstract Only.

Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001. Abstract Only.

Yu, Z. et al., "Preparation of Nanometer-sized Alumina Whiskers," Journal of Materails Research, vol. 13, No. 11, pp. 3017-3018, 1998. Abstract Only.

Kimura, Y., et al., "Synthesis of poly[(acyloxy)aloxane] with carboxyl ligand and its utilization for hte processing of alumina fiber," vol. 20, No. 10, pp. 2329-2334, 1987. Abstract Only.

Podergin, V., et al., "Electron-microscopic study of whiskers formed during pentoxide reduction by alunium," Metalloterm, Protsessy Khim. Met., pp. 44-50, 1972. Abstract Only.

Park, B., et al., "Preparation of High-Capacity Ceramic Catalytic Support from Gibbsite," Han'Guk Seramik Hakhoechi, vol. 39, No. 3, pp. 245-251, 2002. Abstract Only.

Brusasco R., et al., "Preparation and Characterization of Fibrillar Boehmite and g-Aluminum Oxide," Materials Research Bulletin, vol. 19, No. 11, pp. 1489-1496, 1984. Abstract Only.

Kuang, X., et al., "Preparation of Special-shaped g-AlOOH g-Al2O3 Ultrafine Powders by Hydrothermal Reaction Method," Materials and Components for Engines, pp. 594-597, 1994, Abstract Only.

Liu, S., et al., "Synthesis of Novel Nanostructured g-Al2O3 by Pyrolysis of Aluminumoxyhdride-HAIO," Journal of Materials Chemistry, vol. 13, No. 12, pp. 3107-3111, 2003. Abstract Only.

Hicks, R., et al., "Nanoparticle Assembly of Mesoporous AlOOH (Boehmite)," Chemistry of Materials, vol. 15, No. 1, pp. 78-82, 2003. Abstract Only.

Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004. Abstract Only.

McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997. Abstract Only.

Kuang, D., et al., "Fabrication of Boehmite AlOOH and Gamma-Al2O3 Nanotubes via a Soft Solution Route," Journal of Materials Chemistry, vol. 13, No. 4, pp. 660-662, 2003. Abstract Only.

Tijburg, I., et al., "Sintering of Psuedo-Boehmite And Gamma-Al2O3," Journal of Materials Science, vol. 26, No. 21, pp. 5945-5949, 1991. Abstract Only.

Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004. Abstract Only.

Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994. Abstract Only.

Kim, S., et al., "Preparation of High-Temperature Catalytic Support from Gabbsite II. Properties of Amorphous Alumina as Precursor of Catalyst Support, " Journal of the Korean Ceramic Society, vol. 33, No. 1, pp. 92-100, 1996. Abstract Only.

Zhang, Z., et al., "Mesostructured Forms of Gamma-A(sub2)O(sub 3)," J. Am. Chemc. Soc., Vo. 124, No. 8, p. 15, ISSN/ISBN: 00027863. Abstract Only, (2002).

Llusar, M. et al., "Templated growth of Alumina-based Fibers Through the Use of Anthracenic Organogelators," Chemistry of Materials, vol. 14, No. 12, pp. 5124-5133, 2002. Abstract Only.

Strek, W., et al., "Preparation and Emission Spectra of Eu(III) in Nanostrcutred Gamma-Alumina," Spectrochimica Acta, Part A, vol. 54A, No. 13, pp. 2121-2124, 1997. Abstract Only.

Yogo, T., et al., "Synthesis of Polycrystalline Alumina Fibre with Aluminium Chelate Precursor," Journal of Materials Science, vol. 26, No. 19, pp. 5292-5296, 1999. Abstract Only.

Saraswati, V., et al., "X-ray Diffraction in Gamma-alumina Whiskers," Journal of Crystal Growth, vol. 83, No. 4, pp. 606-609, 1987. Abstract Only.

Zhu, H., et al., "Growth of Boehmite Nanoribers by Assembling Nanoparticles with Surfactant Micelles," Journal of Physical Chemistry, vol. 108, No. 14, pp. 4245-4247, 2006. Abstract Only.

Kamiya, K. et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996. Abstract Only.

Iucuta, P., et al., "Phase Evolution in Al2O3 Fibre Prepared From an Oxychloride Precursor," Journal of Materials Science, vol. 27, No. 22, pp. 6053-6061, 1992. Abstract Only.

L.A. Blank et al., "Modification of fillers for Ftorlon-4 with microfibrous boehmite", Sov. Plast., 1972, 2, 66-67.

Paul A. Buining et al., "Preparation on (non-)aqueous dispersions of colloidal boehmite needles", Chemical Engineering Science, 48(2), 411-417, 1993.

Johann Buitenhuis et al., "Phase separation of mixtures of colloidal boehmite rods and flexible polymer," Journal of Colloid and Interface Science, 1995, 175, 46-56.

V.G. Fitzsimmons, W.A. Zisman, "Microfiber reinforcement of polytetrafluoroethylene", Modern Plastics, 1963, 40 (5), 151-154, 158, 160-162, 238-241.

John Bugosh et al., "A Novel fine alumina powder, fibrillar boehmite", I&EC Product Research and Development, vol. 1, No. 3, Sep. 1962.

P.A. Buining et al., "Preparation and properties of dispersions of colloidal boehmite rods", Progr Colloid Polym Sci 93:10-11 (1993).

Sridhar Komarneni, "Nanocomposites", J. Mater. Chem., 1992, 2(12), 1219-1230.

S. Furuta et al., "Preparation and properties of fibrous boehmite sol and its application for thin porous membrane", Journal of Materials Science Letters 13 (1994) 1077-1080.

B.S. Gevert and Zhong-Shu Ying, "Formation of fibrillar boehmite", Journal of Porous Materials, 6, 63-67 (1999).

M.P.B. Van Bruggen, "Preparation and properties of colloidal core-shell rods with adjustable aspect ratios", Langmuir 1998, 14, 2245-2255.

John Bugosh, "Colloidal alumina - the chemistry and morphology of colloidal boehmite", J. Phys. Chem., 1961, 65 (10), pp. 1789-1793.

Paul A. Buining et al., "Effect of hydrothermal conditions on the morphology of colloidal boehmite particles: Implications for fibril formation and monodispersity", J. Am. Ceram. Soc., 1990, 73[8] 2385-90.

International Search Report from PCT/US09/067681; Our Ref: 1035-A4860-C-PCT (1 pg.).

* cited by examiner

PIGMENTS AND POLYMER COMPOSITES FORMED THEREOF

CROSS-REFERENCE TO RELATED APPLICATION(S)

The following disclosure is a divisional application, which claims priority to U.S. application Ser. No. 11/269,508 filed Nov. 8, 2005, entitled "Pigments and Polymer Composites Formed Thereof" and having named inventors, Catherine Bianchi, Shamshad Noor, Christopher Mirley, Ralph Bauer, and Doruk Yener which application is incorporated by reference herein in its entirety.

FIELD OF THE DISCLOSURE

The present application is related generally to polymer composites and pigments.

BACKGROUND

In general, colored plastics or polymer materials are desirable for use in a variety of applications, such as plastic consumer products and polymer composite building materials. Such colored plastics and polymer materials provide improved appearance and aesthetic character to the objects into which they are formed. Typically, pigments or dyes are added to polymer materials to produce the colored polymer materials.

However, traditional colored polymer materials can fade, lose color, or undergo aesthetically displeasing color changes. Traditional dyes may leach from the polymer material or may lose color or bleach through thermal degradation or degradation caused by exposure to radiation, such as ultraviolet electromagnetic radiation. Leaching is a particular problem for dyes blended in halogenated polyolefins. As such, polymer materials including such dyes may have poor color fastness.

In addition, dispersion of traditional pigments with polymer materials is difficult. Poor dispersion leads to swirling and color variability with the colored polymer material. Further, poor dispersion of the pigment within the plastic article may lead to undesirable mechanical properties. As such, compatibilizers are typically used to disperse pigment within a polymer material. Such compatibilizers include a variety of organic compounds that aid in dispersing the pigment. In addition, pigments are dispersed using high shear mechanical processes. However, compatibilizers typically are expensive and may also influence mechanical properties of the colored polymer material.

Accordingly, there is a continued need within the industry to provide pigments and plastics having improved fastness, stability and resistance to bleaching and color leaching.

SUMMARY

In a particular embodiment, a pigment includes an alumina hydrate particulate material and a dye. The dye is covalently bonded to a surface of the alumina hydrate particulate material.

In another exemplary embodiment, a composite material includes a polymer matrix and a pigment dispersed in the polymer matrix. The pigment includes an alumina hydrate particulate material and a dye. The dye is covalently bonded to a surface of the alumina hydrate particulate material.

In a further exemplary embodiment, a composite material includes a polymer matrix incorporating a pigment. The pigment includes a triazine dye covalently bonded to a surface of a boehmite particulate material. The boehmite particulate material has a specific surface area not greater than about 250 $m^2/g$ and has an average particle size not greater than about 1000 nm.

In an additional embodiment, a method for forming a pigment includes providing a slurry comprising an alumina hydrate particulate material and adding a dye and the slurry to form a pigment slurry. The dye includes a functional group configured to facilitate covalent bonding with a surface group of the alumina hydrate particulate material.

In a further embodiment, a method of forming a composite material includes mixing a pigment and a polymer to form a polymer mixture. The pigment includes an alumina hydrate particulate material and a dye covalently bonded to a surface group of the alumina hydrate particulate material. The method also includes melting the polymer mixture to form the composite material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

Figure 1:
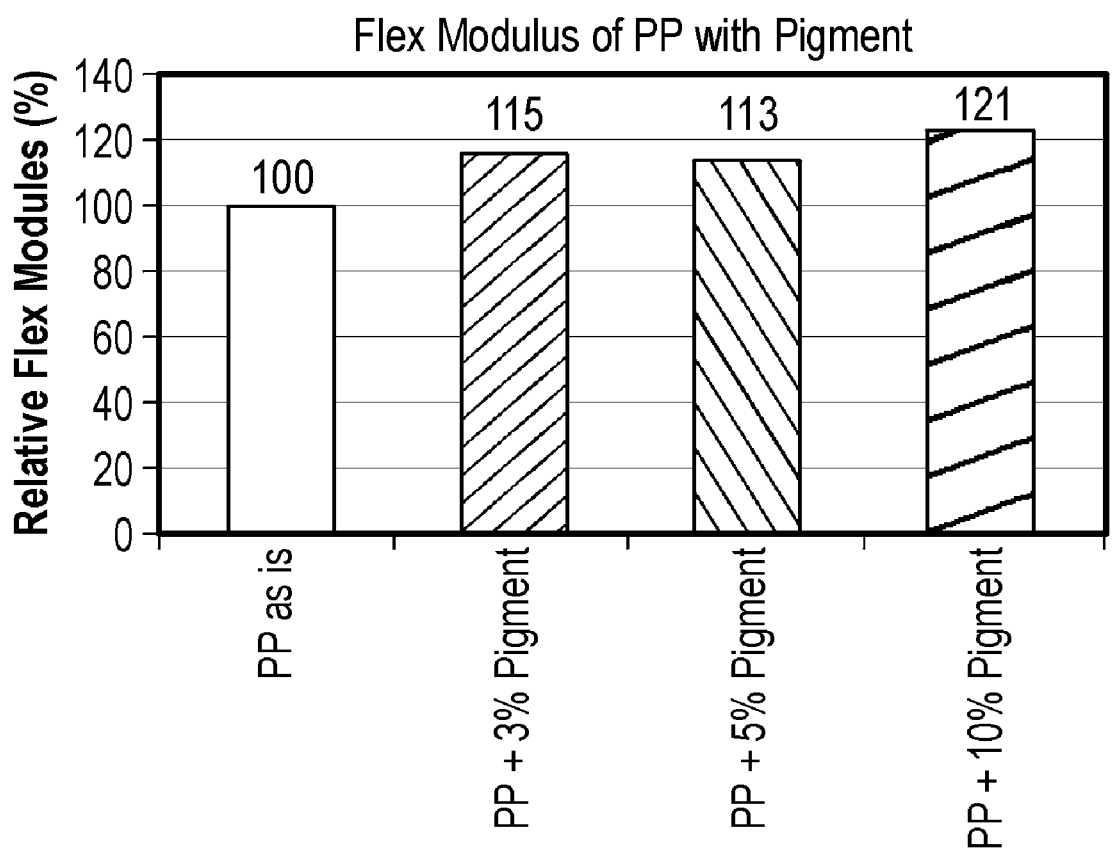
FIGS. 1, 2, 3, and 4 include illustrations of material properties, such as relative flex modulus, impact strength, relative percent crystallinity, and T50, of an exemplary polymer composite.

In a particular embodiment, a composite material is formed of a polymer matrix and a pigment. The pigment includes alumina hydrate particulate having a dye covalently bonded to the surface of the alumina hydrate particulate. For example, the dye may be covalently bonded in place of a hydrogen and to an oxygen of a hydroxyl surface group of the alumina hydrate particulate. In an exemplary embodiment, the polymer matrix is formed of a polyolefin or a halogenated polyolefin.

In another exemplary embodiment, a method of forming a pigment includes preparing a slurry including alumina hydrate particulate material. The method further includes adding dye to the slurry to form a pigment slurry. The dye has a functional group configured to facilitate covalent bonding with the alumina hydrate particulate material, such as with a hydroxyl group on the surface of the alumina hydrate particulate material. Once formed, the pigment slurry may be dried and milled to produce the pigment. In a particular embodiment, the pigment may be blended with a polymer material, such as a thermoplastic polymer, and extruded or melt blended to form a composite material.

In an exemplary embodiment, the composite material includes a polymer matrix and a pigment dispersed in the polymer matrix. The polymer matrix may be formed of a thermoplastic polymeric material or of a thermoset polymeric material. In an example, the polymer matrix is formed of a thermoplastic polymer, such as a polyolefin or a halogenated polyolefin. For example, the thermoplastic polymer may include a polymer, a polymer blend, or a copolymer formed from a monomer, such as ethylene, propylene, vinyl chloride, vinylidene chloride, vinyl fluoride, vinylidene fluoride, tetrafluoroethylene, chlorotrifluoroethylene or combinations thereof. As such, a thermoplastic polymer may include polyethylene, polypropylene, polyvinylchloride (PVC), polyvinylidenechloride (PVDC), polyvinylflouride (PVF), polyvinylidenefluoride (PVDF), polytetrafluoroethylene (PTFE), polychlorotrifluoroethylene (PCTFE), or combinations thereof. In a further exemplary embodiment, the thermoplastic polymer may include a polymer, a polymer blend, or a copolymer including a polyacrylate, such as polymethylmethacrylate (PMMA), polymethyl acrylate (PMA), polyacrylic acid (PAA), polybutyl acrylate (PBA); a polyamide, such as nylon 6, nylon 11, nylon 12; a polyester, such as polyethylene terephthalate (PET), or polybutylene terephthalate (PBT); a polyurethane; a polycarbonate; or cellulose, including esters or nitrates thereof. In an additional example, the thermoplastic polymer may be a polymer, a polymer blend, or a copolymer including ethyl vinyl acetate (EVA), ethyl vinyl alcohol (EVOH), ethylene propylene diene monomer (EPDM), polymethylpentene (PMP), polyethylene oxide (PEO), or polyetheretherketone (PEEK).

Alternatively, the polymer matrix may be formed of a thermoset polymer. For example, the polymer matrix may be formed of a polymer, such as epoxy, phenolic resin, melamine, furan, urea-formaldehyde, polyurethane, silicone, vinyl ester, or unsaturated polyester resin.

In an exemplary embodiment, the composite material includes a pigment dispersed in the polymer matrix. The pigment includes alumina hydrate particulate material having a dye covalently bonded to the surface of the alumina hydrate particulate.

In general, the alumina hydrate particulate material includes hydrated alumina conforming to the formula: $Al(OH)_a O_b$, where $0<a\leq 3$ and $b=(3-a)/2$. In general, the alumina hydrate particulate material has a water content of about 1% to about 38% by weight, such as about 15% to about 38% water content by weight. In a particular embodiment, the alumina hydrate particulate material is free of non-alumina ceramic materials, and, in particular, is free of silica and aluminosilicate materials. By way of example, when a=0 the formula corresponds to alumina ($Al_2O_3$).

Alumina hydrate particulate materials can include aluminum hydroxides, such as ATH (aluminum tri-hydroxide), in mineral forms known commonly as gibbsite, bayerite, or bauxite, or can include alumina monohydrate, also referred to as boehmite. Such mineral form aluminum hydroxides can form alumina hydrate particulate material useful in forming the pigment or can be used as an aluminous precursor, for further processing, such as in a seeded hydrothermal treatment, described in more detail below.

According to an embodiment, the alumina hydrate particles have an aspect ratio, defined as the ratio of the longest dimension to the next longest dimension perpendicular to the longest dimension, generally at least about 2:1, and, in particular, at least about 3:1, such as at least about 4:1, or at least about 6:1. Particular embodiments have relatively elongated particles, such as at least about 8:1, at least about 10:1, and, in particular examples, at least about 14:1.

With particular reference to the morphologies of the alumina hydrate particles, different morphologies are available, such as needle-shaped, ellipsoidal-shaped, and platelet-shaped particles. For example, particles having a needle-shaped morphology may be further characterized with reference to a secondary aspect ratio defined as the ratio of the second longest dimension to the third longest dimension perpendicular to the first and second longest dimensions. The secondary aspect ratio of needle-shaped particles is generally not greater than about 3:1, typically not greater than about 2:1, or not greater than about 1.5:1, and oftentimes about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, the alumina hydrate particles can be platey or platelet-shaped particles generally of an elongated structure having a primary aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally at least about 3:1, such as at least about 6:1, or at least about 10:1. Typically, the shortest dimension or edge dimension, perpendicular to the opposite major surfaces or faces, is generally less than 50 nanometers, such as less than about 40 nanometers, or less than about 30 nanometers.

According to another embodiment, the alumina hydrate particles can be ellipsoidal-shaped particles generally of an elongated structure having a primary aspect ratio described above in connection with the needle-shaped particles. In addition, the ellipsoidal-shaped particles may be characterized as having a secondary aspect ratio not greater than about 2:1, not greater than about 1.5:1, or about 1:1.

Morphology of the alumina hydrate particulate material may be further defined in terms of particle size and, more particularly, average particle size. As used herein, the "average particle size" is used to denote the average longest or length dimension of the particles. Generally, the average particle size is not greater than about 1000 nanometers, such as about 75 nanometers to about 1000 nanometers. For example, the average particle sizes may be not greater than about 800 nanometers, not greater than about 500 nanometers, or not greater than about 300 nanometers. In the context of fine particulate material, embodiments have a particle size not greater than 250 nanometers, such as not greater than 225 nanometers. Due to process constraints of certain embodiments, the smallest average particle size is generally at least about 75 nanometers, such as at least about 100 nanometers, or at least about 135 nanometers.

Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether dispersed or agglomerated forms. Of course, agglomerates have a comparatively larger average particle size, and the present disclosure does not focus on agglomerate sizing.

In addition to aspect ratio and average particle size of the alumina hydrate particulate material, morphology of the particulate material may be further characterized in terms of specific surface area. Herein, specific surface area of the particulate material relates to specific surface area as measurable by the commonly available BET technique. According to embodiments herein, the alumina hydrate particulate material has a specific surface area, generally not less than about 10 $m^2/g$, such as not less than about 20 $m^2/g$, 30 $m^2/g$, or not less than about 40 $m^2/g$. Since specific surface area is a function of particle morphology as well as particle size, generally the specific surface area of embodiments is not greater than about 250 m²/g, such as not greater than about 200 m²/g or not greater than about 100 m²/g. In particular, the surface area may be about 50 m²/g to 250 m²/g. In an exemplary embodiment, needle shaped alumina hydrate particulate has a specific surface area of about 100 m²/g to about 250 m²/g. In another exemplary embodiment, platelet shaped alumina hydrate particulate has a specific surface area about 50 m²/g to about 98 m²/g.

In a particular embodiment, when a is approximately one (1) within the general formula: $Al(OH)_aO_b$, where $0<a\leq3$ and $b=(3-a)/2$, the alumina hydrate material corresponds to boehmite. More generally, the term "boehmite" is used herein to denote alumina hydrates including mineral boehmite, typically being $Al_2O_3 \cdot H_2O$ and having a water content on the order of 15%, as well as psuedoboehmite, having a water content greater than 15%, such as 20-38% by weight. As such, the term "boehmite" will be used to denote alumina hydrates having 15% to 38% water content, such as 15% to 30% water content by weight. It is noted that boehmite (including psuedoboehmite) has a particular and identifiable crystal structure, and accordingly unique X-ray diffraction pattern, and as such, is distinguished from other aluminous materials including other hydrated aluminas. Boehmite can be obtained by processing aluminous minerals, such as an aluminous precursor through a seeded processing pathway, to provide desirable morphology and particle characteristics.

According to one embodiment, the boehmite particles have an aspect ratio of at least about 2:1, and particularly at least 3:1, at least 4:1, or at least 6:1. Indeed, certain embodiments have relatively elongated particles, such as not less than 8:1, not less than 10:1, and in some cases, not less than 14:1. Like the aluminous materials previously discussed, the boehmite has various morphologies, such as needle-shaped, ellipsoidal-shaped, and platelet-shaped particles.

Turning to the details of the processes by which the boehmite particulate material may be manufactured, generally ellipsoid, needle, or platelet-shaped boehmite particles are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

The particulate material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the single crystallites formed through processing, rather than the aggregates, which may remain in certain embodiments (e.g., for those products that call for an aggregated material).

Several variables may be modified during the processing of the boehmite raw material to effect the desired morphology. These variables notably include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is performed at 180° C. for two hours in a 2 weight % nitric acid solution, a 90:10 ATH:boehmite seed ratio forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or not less than about 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreases aspect ratio.

Further, when the type of acid or base is modified, holding the other variables constant, the shape (e.g., aspect ratio) and size of the particles are affected. For example, when processing is performed at 180° C. for two hours with an ATH: boehmite seed ratio of 90:10 in a 2 weight % nitric acid solution, the synthesized particles are generally needle-shaped. In contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. If a mixture of acids and bases is utilized, such as 1 weight % KOH and 0.7 weight % nitric acid, the morphology of the synthesized particles is platelet-shaped. Noteworthy, the above weight % values of the acids and bases are based on the solids content only of the respective solid suspensions or slurries, and are not based on the total weight % of the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

According to embodiments described herein, a relatively powerful and flexible process methodology may be employed to engineer desired morphologies into the precursor boehmite product. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies.

The pigment is formed of an alumina hydrate, such as an alumina hydrate as described above, covalently bonded to a dye. In an exemplary embodiment, the dye is an organic dye. For example, the dye may be an organic dye, such as an anthracene dye, an azo dye, an acridine dye, an azine dye, an oxazine dye, a thiazine dye, a quinoline dye, a polymethine dye, a hydrazone dye, a triazine dye, a porphyrin dye, a porphyrazine dye, a sulfur dye, a quinacridone dye, a formazane dye, a nitro dye, a nitroso dye, an azomethine dye or a polyol dye. In a particular embodiment, the dye includes a triazine dye, such as Cibacron HD200% (red), PBN-GR (red), C-2BL (red), FN-2BL (red), PB6R-GR150% (brown), CB (navy), or FN-B (navy), each available from Ciba Specialty Chemicals. In another embodiment, the dye includes a polyol dye.

In a particular embodiment, the dye includes a functional group configured to facilitate covalent bonding with the alumina hydrate. For example, the functional group may undergo a reaction to form a covalent bond with oxygen of a hydroxyl group on the surface of the alumina hydrate particulate. In particular, the function group may facilitate nucleophilic substitution or nucleophilic addition with a hydroxyl group on the surface of the alumina hydrate particulate, such as forming a covalent bond with oxygen of the hydroxyl group in place of the hydrogen. An exemplary functional group includes a halogen atom, such as fluorine, chlorine, or bromine. Another example of a functional group includes sulfatoethylsolfone. A further exemplary functional group may include silanol, zirconate, titanate, carboxylic acid and esters, aldehyde, sulphonic acid, or phosphonic acid. Typically, the functional group is attached to a carbon atom of the organic dye, such as a carbon atom of a functional ring of the organic dye. In a particular embodiment, the functional group is bonded to a carbon atom of the triazine ring of the dye.

Evidence of the covalent bonding of the dye to the surface of the alumina hydrate particulate material, as opposed to a weak secondary bonding mechanism on the surface of the particle or an intercalation mechanism between the layers of a material, is illustrated in Table 1, provided below. Table 1 illustrates the average binding energy of surface aluminum atoms and oxygen atoms of an alumina hydrate particulate material (in this case, boehmite) and compares these results to a sample containing boehmite and a dye. The average binding energies of the surface aluminum and oxygen atoms are measured using Auger spectroscopy. Table 1 demonstrates an attenuation of the average binding energy of aluminum atoms and an increase in the average binding energy of oxygen atoms on the surface of the alumina hydrate particulate material after the addition of the dye, indicating covalent bonding between the dye and oxygen atoms on the surface of the boehmite particles.

TABLE 1

Auger Spectroscopy of two samples demonstrating the change in binding energies of Al and O atoms on the surface of the boehmite with the addition of a dye.

| Sample ID | Al | O |
|---|---|---|
| Boehmite: | | |
| BE (eV) | 1389.15 | 509.9 |
| Atomic % | 47.84 | 52.16 |
| Boehmite + Dye | | |
| BE (eV) | 1388.94 | 510.34 |
| Atomic % | 44.02 | 54.52 |

To form the pigment, the dye may be reacted with particulate alumina hydrate. For example, a slurry may be formed of the particulate alumina hydrate. The slurry may include an aqueous liquid or an organic liquid. In an exemplary embodiment, the slurry is an aqueous slurry that includes not greater than about 30 wt % alumina hydrate particulate, such as not greater than about 20 wt % or not greater than about 15 wt % alumina hydrate particulate. In a further exemplary embodiment, the slurry has a pH not greater than about 7.0, such as not greater than about 5.0.

In an exemplary method, the slurry is heated to within a range of about 25° C. to about 100° C., such as about 40° C. to about 80° C. A dye having a functional group configured to facilitate covalent bonding to the alumina hydrate is added to the slurry. In an exemplary embodiment, the dye may be included in a dye solution that is added to the slurry. In a particular example, the dye solution is an aqueous solution including not greater than about 10 wt % dye. In another example, the dye may be a powder added to the slurry. The slurry may be mechanically mixed or agitated.

Once the pigment has formed, the pigment may be dried. For example, the pigment may be spray dried. The dried pigments may be milled, such as through ball milling, to form a pigment powder.

When a thermoplastic polymer forms the polymer matrix, the method of forming the composite material includes dry mixing the polymer with the pigment to form a polymer mixture. The polymer mixture may be melt to form the composite. For example, the polymer mixture may be extruded. Alternatively, the polymer mixture may be melt blended.

When a thermoset polymer forms the polymer matrix, the method of forming the composite material includes blending a pigment with a solution of polymer precursor. For example, a dry pigment may be mixed with the solution under high shear conditions. In another example, a pigment solution may be mixed with the polymer precursor solution.

In an exemplary embodiment, the composite material includes about 2 wt % to about 25 wt % pigment. For example, the composite material includes about 5 wt % to about 10 wt % pigment. In addition, the composite material may include about 60 wt % to about 98 wt % polymer material, such as about 70 wt % to about 95 wt % polymer material. While the compositions are expressed in percentages, such as weight percentages, it is understood that specification of a percentage of a particular component affects the percentage of other components within a composition and in no way can the cumulative percentage of all components be greater than one hundred percent.

In addition to the pigment, the composite may also include compatibilizers, fillers, antioxidants, ultraviolet radiation absorbers, plasticizer or a combination thereof. For example, the composite may include a plasticizer to improve processability. In another example, the composite may include an antioxidant or an ultraviolet radiation absorber to improve weatherability. In a further embodiment, the composite may include a compatibilizer to improve compatibility between polymers of a polymer blend or to improve dispersion of the pigment. Alternatively, the dye covalently bonded to the alumina hydrate particulate may provide compatibilizing properties. In a particular embodiment, the composite is free of compatibilizer, while exhibiting equivalent or enhanced dispersion of the alumina hydrate particulate.

According to an exemplary embodiment, a composite material including a polymer matrix and an alumina hydrate particulate material having a dye covalently bonded to the surface of the alumina hydrate particle has an improved relative flex modulus as compared to the relative flex modulus of the polymer matrix without alumina hydrate particulate material. In an embodiment, the composite has an improved relative flex modulus of at least about 5%, such as at least 8%, at least 10%, or at least 15%, compared to the relative flex modulus of the polymer matrix without alumina hydrate particulate material.

In another exemplary embodiment, a composite material including a polymer matrix and an alumina hydrate particulate material having a covalently bonded dye has an improved impact strength as compared to the impact strength of a polymer matrix having an equivalent loading of alumina hydrate particulate material without the covalently bonded dye. As such, in certain embodiments, the composite having a polymer matrix and pigment demonstrates an improvement in impact strength of at least about 5%, such as at least about 8%, or at least about 10% when compared to a composite material having an alumina hydrate particulate material without a covalently bonded dye.

In a further exemplary embodiment, the relative percent crystallinity of the composite material is improved for composites having a particular solids loadings content of alumina hydrate particulate material and a covalently bonded dye. According to one embodiment, a composite material having a polymer matrix with a solids loading of at least 5 wt % of an alumina hydrate particulate material including a covalently bonded dye has an increase in the relative percent crystallinity of at least about 5% as compared to a polymer matrix without pigment. In another embodiment, the increase in the relative percent crystallinity is at least about 8%, such as at least about 10%, or at least about 11% for a composite material compared to a polymer matrix without pigment. According to a further embodiment, composite material having a greater solids loading content, such as about 10 wt % of an alumina hydrate particulate material, demonstrates an increase in the relative percent crystallinity of at least about 5%, such as at least about 7% or at least about 10% as compared to a non-composite polymer matrix.

The addition of an alumina hydrate particulate material having a covalently bonded dye to the surface of the alumina hydrate particle provides other improved characteristics, such as higher T50. The T50 is the temperature at which the sample has half of its original sample weight in a thermogravimetric analysis. In an exemplary embodiment, the T50 of a composite containing a polymer matrix incorporating an alumina hydrate particulate material having a covalently bonded dye is improved compared to a non-composite polymer matrix. According to one embodiment, a composite containing a polymer matrix incorporating an alumina hydrate particulate material with a covalently bonded dye has an increased T50 of at least about 1%, such as at least about 3%, or at least about 10% compared to a non-composite polymer matrix.

EXAMPLES

Example 1

Pigment Synthesis

A boehmite particulate material, processed as described above, is provided as the alumina hydrate particulate matter. The boehmite has a needle-shaped morphology and is loaded into an aqueous solvent to form a boehmite sol having a solids loading of about 15 wt % boehmite. The pH of the boehmite sol is acidic and maintained in a range of about 3.0 to 4.0, while the sol is heated to a temperature of about 60° C. to 70° C. and mixed.

A dye solution is formed by combining 0.5 grams of a triazine dye having a sulfatoethylsulfone functional group in 400 ml of deionized water. The dye solution is heated to a temperature of about 60° C. to 70° C. and mixed.

The dye solution is added to the boehmite sol while mixing is continued for about 2 hours at a temperature of 60° C. to 70° C. to form a pigment sol. After mixing, the pigment sol is cooled, excess liquid is decanted and the pigment sol is dried either by freeze drying or rotary drum drying to form a pigment powder. The pigment powder is then milled in a ball mill for about 2 hours to break up agglomerates.

Example 2

Composite

The pigment powder is compounded with a polypropylene polymer matrix. Compounding is performed in a 30 mm, 40:1 L/D, ZSK-30co-rotating intermeshing twin extruder by Werner & Pfleidered, running at 400 rpm. Zone temperature set points incrementally increase from 388° F. at a first zone to 450° F., with the die temperature set at 450° F. Polypropylene in powder form is mixed with red dye boehmite, which may be formed from needle-shaped boehmite and CIBACROM HD200% in accordance with the method of Example 1, in a plastic bag. The mixture is placed in a feed hopper of the twin extruder and the feed rate is approximately 20 lb/hr.

Samples are formed through molding using a Van Dorn 120HT machine, which is equipped with a standard 3-zone screw with a diameter of 38 mm (1.5 in) and a compression ratio of 3:1. At the tip of the screw is a check ring to reduce backflow during injection. The barrel is heated electrically by three heater bands and the nozzle is also heated by a heater band. The temperature profile increases from 380° F. at the feed throat to 440° F. at the nozzle.

The mold is water cooled to 80° F. A clamping force is set to approximately 78 tons. The dosage size is 1.1 inches, which relates to an actual injection volume of approximately 1.7 cuin. After injection, the hold pressure is approximately 1000-1200 psi and the hold time is approximately 10 seconds.

Referring to FIG. 1, the composite including polypropylene and a needle-shaped boehmite having a covalently bonded dye, exhibits improved relative flex modulus compared to the relative flex modulus of polypropylene. As illustrated in FIG. 1, a composite having 3 wt % pigment demonstrates approximately a 15% increase and a 10 wt % pigment illustrates an increase of the relative flex modulus of approximately 21% compared to the polypropylene without pigment.

Figure 2:
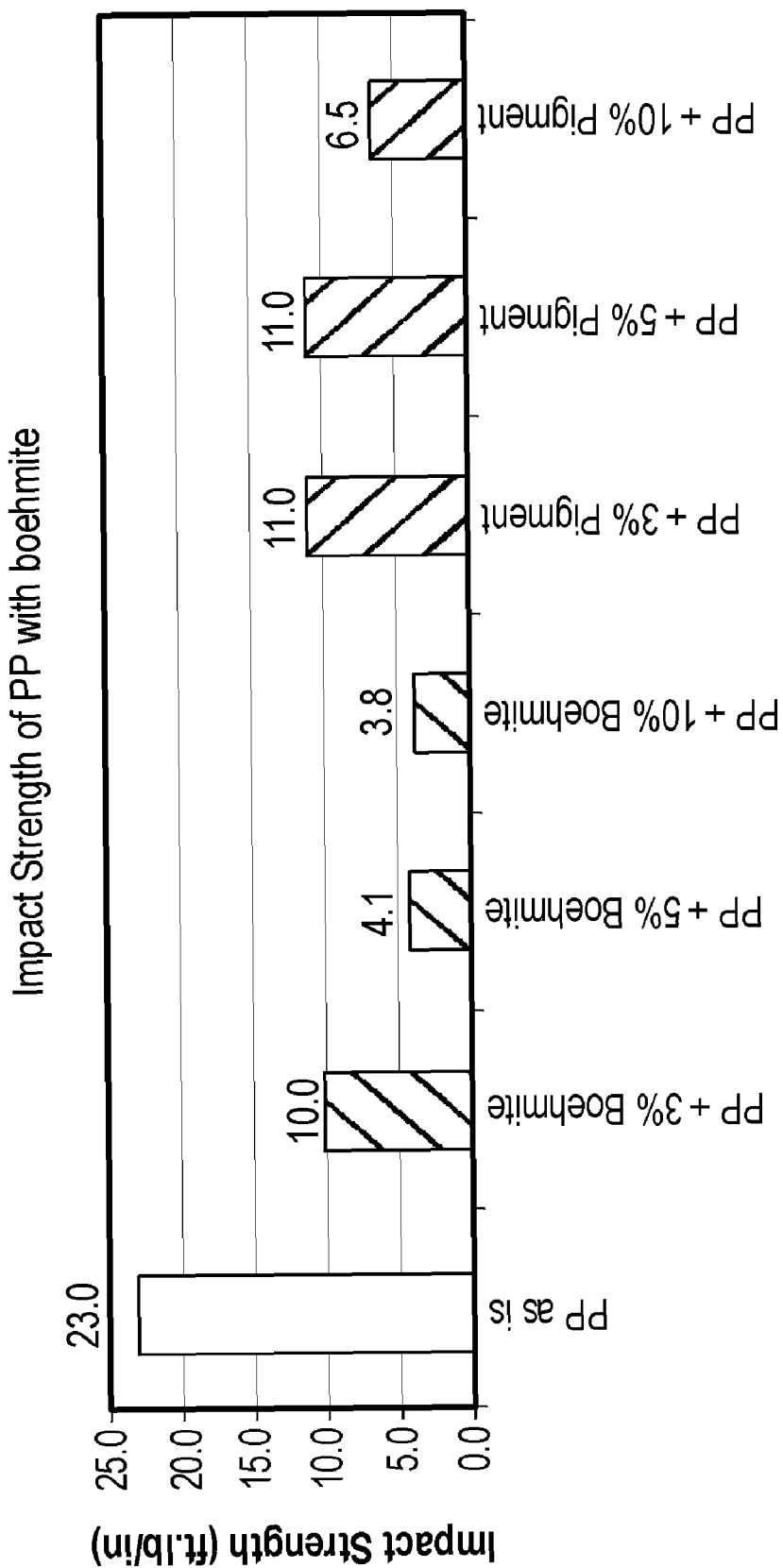

In an exemplary embodiment, the pigmented polypropylene exhibits improved impact strength. For example, referring to FIG. 2, the impact strength of a composite including polypropylene and various solids loading of boehmite having covalently bonded dye is compared to the impact strength of a composite including polypropylene and boehmite without the covalently bonded dye. As illustrated in FIG. 2, each of the composites incorporating the dye demonstrates an improved impact strength over samples of equivalent solids loading of boehmite without the covalently bonded dye.

Figure 3:
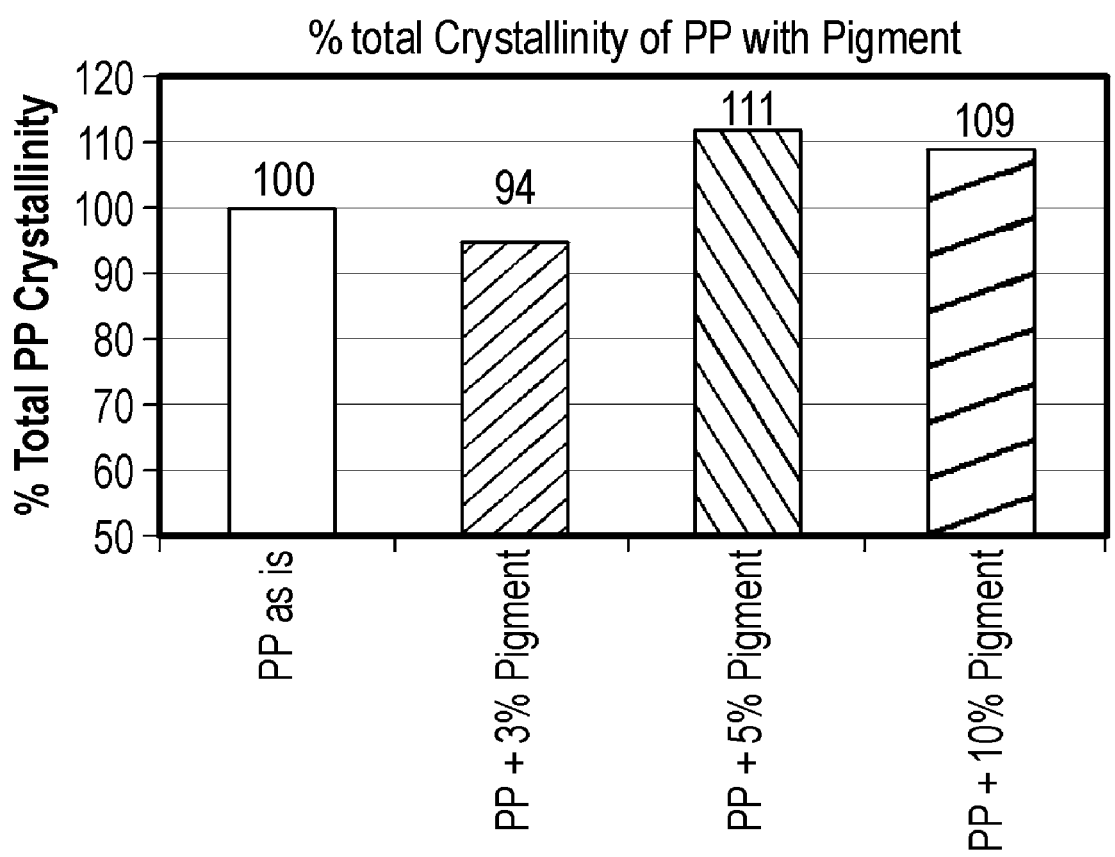

In a particular embodiment, composites including polypropylene and pigment exhibit increased relative percent crystallinity. Referring to FIG. 3, the relative percent crystallinity of polypropylene is compared to the relative percent crystallinity of composites including polypropylene and various loading percentages of boehmite with a covalently bonded dye. As illustrated in FIG. 3, the composite material having 5 wt % of boehmite and a covalently bonded dye demonstrates an increase in relative percent crystallinity of about 11%, and the composite sample containing 10 wt % of boehmite having a covalently bonded dye demonstrates an increase in the relative percent crystallinity of about 9% when compared to the non-composite polypropylene sample.

Figure 4:
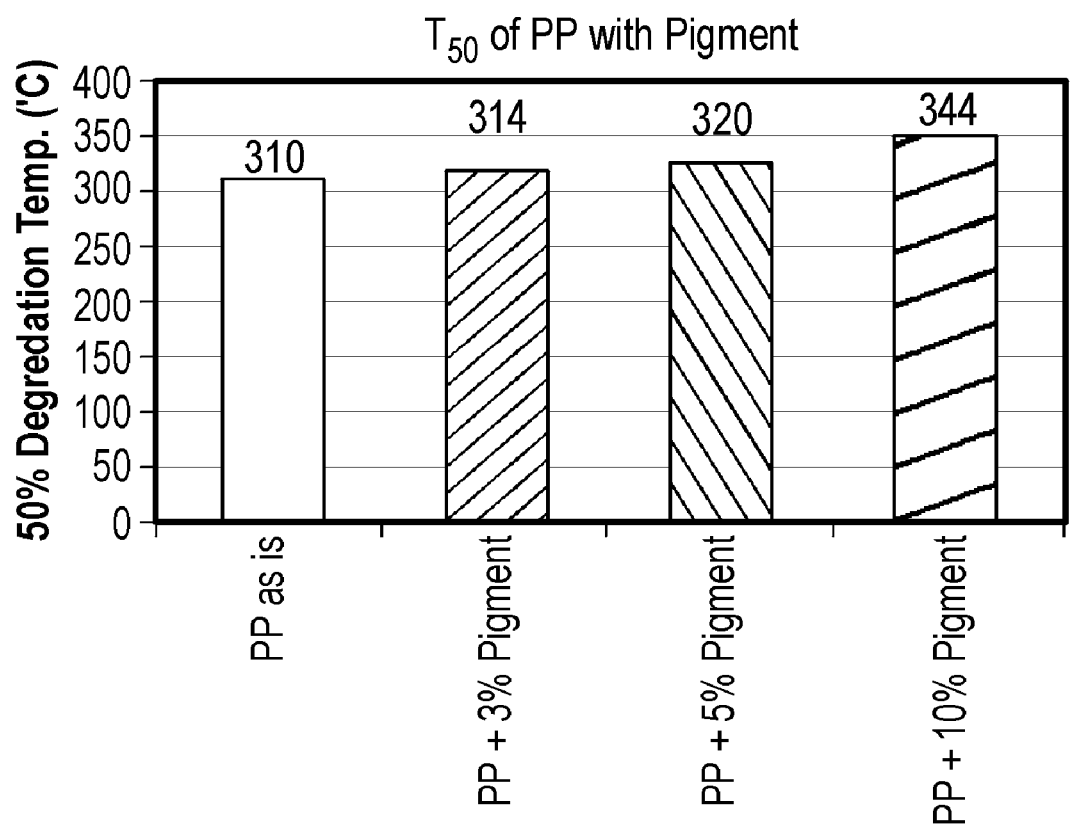

Referring to FIG. 4, the T50 of polypropylene is compared to the T50 of composites including polypropylene and pigment. As illustrated in FIG. 4, the composite material having 3.0 wt % of pigment demonstrates an increase in T50 of 1.29% compared to the non-composite polypropylene sample. The composite sample including 5.0 wt % pigment demonstrates an increase in T50 of 3.22% and the sample including 10.0 wt % pigment demonstrates an increase in the measured T50 of 10.9% when compared to the non-composite polypropylene sample.

Aspects of the present invention enable utilization of the boehmite particulate material in a wide variety of applications, such as in applications requiring higher hardness and/or involving high temperature processing, such as melt processing of fluorinated polymers. Properties of flame retardance, UV protection, weatherability, chemical resistance, thermal conductivity, and electrical resistance make the present pigment a significant industrial material. Other uses include implementation as an additive to paper, as an ink absorbent in inkjet printing, as a filtration media, or as an abrasive in demanding chemical mechanical polishing used in the electronics industry.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A composite material comprising:
   a polymer matrix; and
   a pigment dispersed in the polymer matrix, the pigment comprising an alumina hydrate particulate material and a dye, the dye being directly covalently bonded to an oxygen atom on a surface of the alumina hydrate particulate material.

2. The composite material of claim 1, wherein the alumina hydrate particulate material has a specific surface area not greater than about 250 $m^2/g$.

3. The composite material of claim 1, wherein the alumina hydrate particulate material comprises primarily one of platelet-shaped particles, needle-shaped particles, and an ellipsoidal-shaped particles.

4. The composite material of claim 1, wherein the dye comprises an organic material.

5. The composite material of claim 1, wherein the dye comprises a functional group selected from the group consisting of halogens, sulfatoethylsulfones, silanols, zirconates, titanates, carboxylic acids, esters, aldehydes, sulphonic acids, and phosphonic acids.

6. The composite material of claim 5, wherein the functional group comprises a halogen.

7. The composite material of claim 5, wherein the dye comprises a functional group including a sulfatoethylsulfone.

8. The composite material of claim 1, wherein the dye comprises a polyol dye.

9. The composite material of claim 1, wherein the composite material comprises about 2 wt % to about 25 wt % of the pigment based on a total weight of the composite material.

10. The composite material of claim 1, wherein the polymer matrix comprises a thermoplastic polymer.

11. The composite material of claim 10, wherein the thermoplastic polymer comprises a polyolefin.

12. The composite material of claim 11, wherein the polyolefin comprises a halogenated polyolefin.

13. The composite material of claim 1, wherein the polymer matrix comprises a thermoset polymer.

14. The composite material of claim 1, wherein the polymer matrix is selected from the group consisting of polyacrylates, polyamides, polyesters, polyurethanes, polycarbonates, and cellulose.

15. The composite material of claim 1, wherein the polymer matrix includes at least one of a filler, antioxidant, ultraviolet radiation absorber, and plasticizer.

16. The composite material of claim 1, wherein the composite material has a relative flex modulus increase of at least about 5% compared to a relative flex modulus of the polymer matrix without the alumina hydrate particulate material.

17. The composite material of claim 1, wherein the composite material has an impact strength at least about 5% higher than the composite material having an equivalent loading of alumina hydrate particulate material without covalently bonded dye.

18. The composite material of claim 1, wherein the composite material has a relative percent crystallinity increase of at least about 5% for the composite material having at least about 5 wt % alumina hydrate particulate material compared to the relative percent crystallinity of a polymer matrix without alumina hydrate particulate material.

19. The composite material of claim 1, wherein the composite material has a T50 temperature at least about 1% higher than the polymer matrix without alumina hydrate particulate material.

20. A slurry comprising:
   an alumina hydrate particulate material dispersed within a liquid; and
   a dye directly covalently bonded to an oxygen atom on a surface group of the alumina hydrate particulate material.

* * * * *